United States Patent
Ianos et al.

(10) Patent No.: US 7,940,708 B2
(45) Date of Patent: *May 10, 2011

(54) PCM TYPE INTERFACE

(75) Inventors: Anca-Marina Ianos, Paris (FR); Paolo Pesenti, Agrate-Senago (IT)

(73) Assignees: STMicroelectronics SA, Montrouge (FR); STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 12/695,520

(22) Filed: Jan. 28, 2010

(65) Prior Publication Data
US 2010/0135317 A1 Jun. 3, 2010

Related U.S. Application Data

(63) Continuation of application No. 11/484,880, filed on Jul. 11, 2006, now Pat. No. 7,680,069.

(30) Foreign Application Priority Data

Jul. 11, 2005 (FR) ...................................... 05 07392

(51) Int. Cl.
*H04B 7/005* (2006.01)
(52) U.S. Cl. ...................................................... 370/278
(58) Field of Classification Search .......... 370/276–282, 370/294, 296, 297, 310, 431, 437, 464, 465; 709/208, 209, 217–223, 227, 248, 250
See application file for complete search history.

(56) References Cited

U.S. PATENT DOCUMENTS

| | | | |
|---|---|---|---|
| 5,311,114 A * | 5/1994 | Sambamurthy et al. ...... | 370/296 |
| 5,590,284 A | 12/1996 | Crosetto | |
| 5,930,246 A | 7/1999 | Akutsu | |
| 6,330,247 B1 | 12/2001 | Chang et al. | |
| 6,640,308 B1 * | 10/2003 | Keyghobad et al. .......... | 713/300 |
| 6,697,614 B2 | 2/2004 | Dorenbosch | |
| 6,717,439 B2 | 4/2004 | Ohkubo | |
| 6,760,772 B2 | 7/2004 | Zou et al. | |
| 6,948,023 B2 | 9/2005 | Huang et al. | |
| 2002/0159460 A1 * | 10/2002 | Carrafiello et al. ........... | 370/392 |
| 2005/0060471 A1 * | 3/2005 | van Engelen et al. ........ | 710/305 |

OTHER PUBLICATIONS

IEEE 100 The Authoritative Dictionary of IEEE Standards Terms, IEEE, 2000, pp. 1-2 and 501.

* cited by examiner

*Primary Examiner* — Dmitry H Levitan
(74) *Attorney, Agent, or Firm* — E. Russell Tarleton; Seed IP Law Group PLLC

(57) ABSTRACT

An interface device having a first and second data terminal configured for the communication of data in duplex mode, with one of the first and second data terminals always assigned to each direction of the communication, the first and second data terminals configurable during operation such that, in a first mode of operation, the first data terminal is configured to send but not to receive data and the second data terminal is configured to receive but not send data, while in a second mode of operation the first data terminal is configured to receive but not to send data and the second data terminal is configured to send but not to receive data.

15 Claims, 6 Drawing Sheets

PCM TYPE INTERFACE

BACKGROUND OF THE INVENTION

1. Field of the Invention

The present invention concerns PCM type interfaces (where PCM stands for "Pulse Code Modulation").

2. Description of the Related Art

PCM is a method for synchronous multiplexing and encoding, in which audio signals are represented in the form of a digital data signal multiplexed by time division multiple access (TDMA). A PCM signal is therefore a digital signal obtained by temporal multiplexing of multiple analog voice signals sampled using the same reference for sampling.

As is shown in FIG. 1, a prior art PCM interface of a functional unit 10 comprises:

a first clock terminal Clk and a second clock terminal FS, each configured to receive or to send a bit-level synchronizing clock signal CLK_Bit and a frame-level synchronizing clock signal CLK_Frame; and, a data input terminal IN and a data output terminal OUT, respectively configured to receive a data signal PCM_Rx and to send a data signal PCM_Tx in duplex mode.

In telephony applications, the audio spectrum considered as significant corresponds to a band of 300-3400 Hz. As it is known that the sampling frequency must be more than twice the maximum frequency of this band (Shannon's theorem), the value of the sampling frequency chosen is typically 8 kHz. Therefore the time between two successive samples from an audio channel (also called audio path) is equal to 125 μs. The frequency of the frame-level synchronizing clock signal CLK_Frame is equal to the audio signal sampling frequency. In this manner, there is a sample of a given audio channel per frame.

If an audio signal sample is encoded into 8 bits, at 64 kilobits/channel, the frequency of the bit-level synchronizing clock signal CLK_Bit is then equal to N×64 kHz, where N is the number of channels multiplexed by TDMA within a frame, meaning within a period of the frame-level synchronizing clock signal CLK_Frame. The fraction of a frame allocated to a given channel is called the time interval (TI). In the European system standardized by the CCITT (recommendation G732), N is equal to 32 (known as "32 channel PCM"), such that the frequency of the CLK_Bit signal is equal to 2.048 MHz. Therefore for each frame there are 30 voice channels (TI numbers 1 to 15 and 17 to 30), 1 signaling channel (TI number 16) for transmitting the signaling in flag mode or in channel by channel mode, and a synchronization channel (TI number 0) for transmitting frame synchronization information.

The high availability and low cost of various PCM interface circuits is such that almost all audio systems appearing over the last few decades use PCM, although there is a current tendency to prefer the format of the I²S (Inter-IC Sound) standard, which allows the stereo transmission of audio data (in particular music).

In standard PCM interfaces, generally the clock terminals Clk and FS are bi-directional/reversible, such that the unit 10 delivers the respective clock signals CLK_Bit and CLK_Frame, or receives them from the outside, via these two terminals. In the first case, unit 10 is said to be a master unit. In the second case, unit 10 is said to be a slave unit. The type, master or slave, of the functional units of a system may thus be configured as needed for the application.

At a given moment the unit 10 may receive a data signal PCM_Rx via the IN terminal, and send a data signal PCM_Tx via the OUT terminal. The communication of data therefore occurs in duplex mode. The function of the IN and OUT terminals is fixed, however.

As is shown in FIG. 2, an electronic system comprises for example several functional units 11 to 14 which communicate with each other using the PCM, and each has a standard PCM interface. The PCM interfaces are connected by a connecting network 20 which is fixed, meaning not configurable during operation. Such a connecting network comprises point-to-multipoint links. Only one of the functional units is a master, with its clock inputs Clk and FS respectively configured to send the clock signal CLK_Bit and the clock signal CLK_Frame. The others are slave units, with their clock inputs Clk and FS respectively configured to receive the clock signal CLK_Bit and the clock signal CLK_Frame.

In the example represented in FIG. 2, the unit 12, which may for example be the master unit, can send data to each of the units 11, 13, and 14 (its OUT output is connected to the IN input of each of these three units). Similarly, it can receive data from each of these three units (its IN input is connected to the OUT output of each of these three units).

On the other hand, the functional units 11, 13 and 14 cannot directly exchange data with each other without generating a transmission conflict (their respective IN inputs connected together, and their respective OUT outputs connected together). In practice, when unit 11 wants to exchange data with unit 13, for example, these two units communicate indirectly through unit 12.

This generates transmission delays, requires the providing of additional resources in functional unit 12 (particularly buffers), and necessitates more complex means of control in order to operate the system under the different possible utilization scenarios.

BRIEF SUMMARY OF THE INVENTION

The disclosed embodiments of the invention correct the disadvantage of the prior designs by proposing a new type of PCM interface.

A first aspect of the invention thus relates to an interface device configured for communicating data in duplex mode and comprising a first and second data terminal, with one of the first and second data terminals permanently assigned to each direction of the communication. The first and second data terminals are configurable during operation such that, in a first mode of operation, the first data terminal is configured to send but not to receive data and the second data terminal is configured to receive but not to send data, while in a second mode of operation, the first data terminal is configured to receive but not to send data and the second data terminal is configured to send but not to receive data.

Thus the communication of data always occurs in duplex mode but the function of the first and second data terminals is not fixed. At each given moment one of the first and second data terminals is assigned to each direction of the communication, but the respective function of each (receiving or sending data) may change over time.

In one embodiment, in which the data are received or sent in the form of frames, each comprising multiple logical channels multiplexed by TDMA and respectively associated with time intervals, the first and second data terminals are configurable with sufficient flexibility to switch from the first mode of operation to the second mode of operation, or the reverse, from one time interval to the next. This gives the greatest possible flexibility in managing the different uses according to the requirements for communication between functional units having interfaces of this type.

In one embodiment, the interface additionally comprises a frame-level synchronizing clock terminal for receiving or sending a frame-level synchronizing clock signal, and a bit-level synchronizing clock terminal for receiving or sending a bit-level synchronizing clock signal. This allows synchronous communication between functional units having interfaces of this type, with one of the interfaces being the master and the other or others the slave.

In one example implementation, the interface device may be configured for data communication in PCM format.

A second aspect of the invention relates to an electronic device (or functional unit) comprising an interface according to the first aspect, as well as a first group of N data registers and a second group of N data registers, respectively for storing data received from N other respective electronic devices and for storing data to be sent to these N other respective electronic devices.

When the data are received or sent in the form of the abovementioned frames, the data stored in the N data registers of the first group, or of the second group, respectively, may be received or sent, respectively, in N respective time intervals of a frame.

A third aspect of the invention relates to an electronic system comprising multiple electronic devices according to the second aspect, connected to each other by a connecting network that is fixed, meaning it is not configurable during operation.

A fourth aspect of the invention relates to a portable telephone comprising an electronic system according to the third aspect.

Finally, a fifth aspect of the invention relates to a method for communicating data in duplex mode, implemented in an electronic device via an interface configured for communicating data in duplex mode and including a first and a second data terminal, with one of the first and second data terminals permanently assigned to each direction of the communication. The method includes the configuration during operation of the first and second data terminals such that, in a first mode of operation, the first data terminal is configured to send but not receive data and the second data terminal is configured to receive but not to send data, while in a second mode of operation, the first data terminal is configured to receive but not to send data and the second data terminal is configured to send but not to receive data.

In one implementation of the method, in which the data are received or sent in the form of frames each comprising multiple logical channels multiplexed by TDMA, respectively associated with time intervals, the first and second data terminals can be configured with sufficient speed to switch from the first mode of operation to the second mode of operation, or the reverse, from one time interval to another.

In one implementation, data received from N other electronic devices are stored N respective data registers of a first group of registers, and data to be sent to said N other electronic devices are stored in N respective data registers of a second group of registers.

The data received or sent in N respective time intervals of a frame, may be stored in the N data registers of the first group or of the second group, respectively.

The invention therefore allows increasing the number of possible ways of using a system comprising more than two functional units connected to each other by a fixed connecting network for exchanging data in duplex mode.

The invention is particularly advantageous and innovative in the context of PCM interfaces. Even so, it can be applied to any type of interface for exchanging data in duplex mode using a protocol of at least two wires (one for each direction the data are communicated).

In accordance with another aspect of the invention, a circuit adapted for use with an interface is provided, the interface having an input and an output, the circuit including a multiplexer having an output coupled to the input of the interface, the multiplexer having a first input coupled to a first port and a second input coupled to a second port; and a transmission circuit having an input coupled to the output of the interface and a first output coupled to the first port and a second output coupled to the second port; and a control circuit coupled to the multiplexer and the transmission circuit to control transmission and reception of data on the first port and the second port.

In accordance with another aspect of the invention, the circuit configures the transmission circuit and the multiplexer in a first mode of operation in which the first port is configured to send but not to receive data and the second port is configured to receive but not to send data, and in a second mode of operation the first port is configured to receive but not to send data and the second port is configured to send but not to receive data.

In accordance with another aspect of the invention, the circuit includes a frame-level synchronizing clock terminal for receiving and sending a frame-level synchronizing clock signal to the interface and a bit-level synchronizing clock terminal for sending and receiving a bit-level synchronizing clock signal to the interface circuit.

In accordance with another embodiment of the invention, an interface circuit is provided that includes an interface having an output and an input; and a circuit for controlling communication of data with the interface, the circuit including a multiplexer having an output coupled to the input of the interface, the multiplexer having a first input coupled to a first port and a second input coupled to a second port; and a transmission circuit having an input coupled to the output of the interface and a first output coupled to the first port and a second output coupled to the second port; and a control circuit coupled to the multiplexer and the transmission circuit to control transmission and reception of data on the first port and the second port.

In accordance with a method of the invention, the method adapted for use with an interface, the interface having an input and an output, the method includes coupling first and second bi-directional data communication ports to the interface input via a multiplexer; coupling the output to the first and second bi-directional data communication ports via a transmission circuit; and controlling the transmission circuit and the multiplexer so that in a first mode of operation the first bi-directional data communication port is configured to send but not to receive data and the second bi-directional data communication port is configured to receive but not to send data, and in a second mode of operation the first bi-directional data communication port is configured to receive but not to send data and the second bi-directional data communication port is configured to send but not to receive data.

BRIEF DESCRIPTION OF THE SEVERAL VIEWS OF THE DRAWING(S)

Other features and advantages of the invention will appear in reading the description which follows. This is purely illustrative and is to be read while referring to the attached drawings, in which.

DETAILED DESCRIPTION OF THE INVENTION

Figure 3:
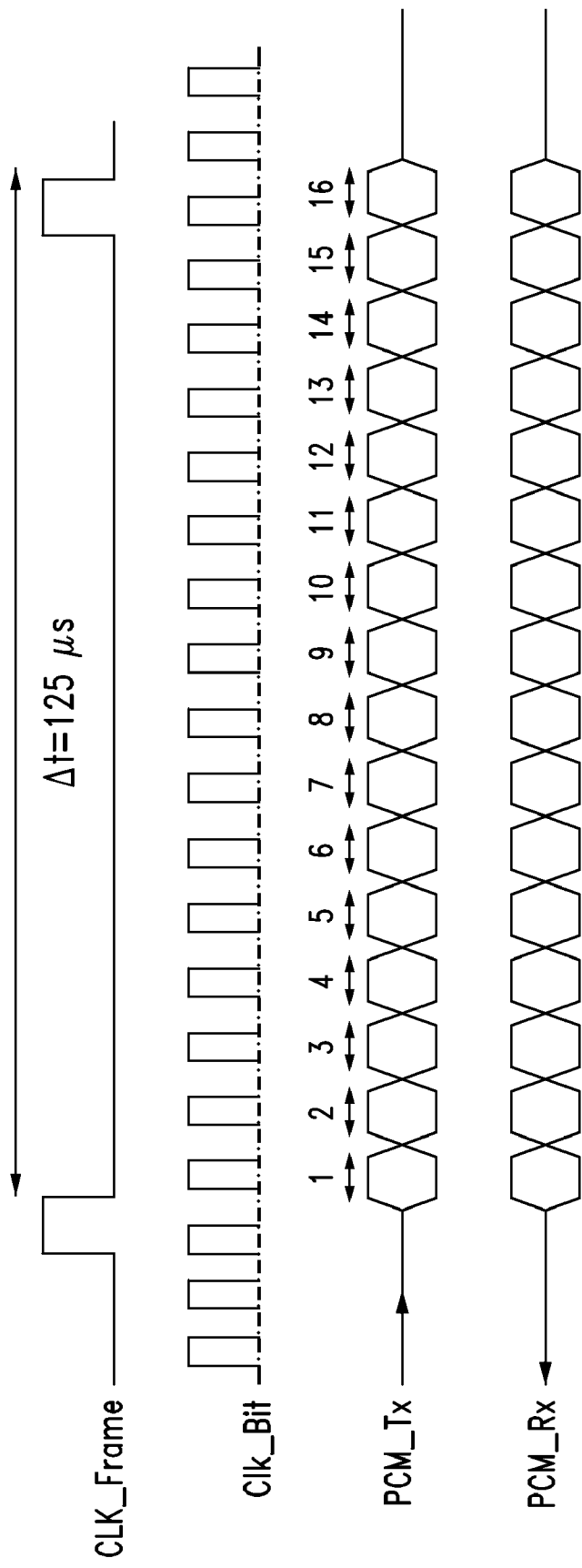
FIGS. 3 and 4 are timing diagrams illustrating the principle of data transmission in PCM format, in the respective cases where each PCM frame comprises one or N multiplexed logical channels.

In FIG. 3, time diagrams for signals CLK_Frame, CLK_Bit, PCM_Tx and PCM_Rx are represented, one below the other, for the case of a single channel PCM signal. In this example, each signal sample is encoded into 16 bits. The 16 bits of a sample of the PCM_Tx or PCM_Rx signal are sent between two pulses of the clock signal CLK_Frame, which means during the period Δt of a CLK_Frame clock cycle.

In the case where the frequency of the CLK_Frame signal is equal to 8 kHz, in other words when Δt equals 125 μs, the frequency of the CLK_Bit signal for such a single channel signal can be equal to 128 kHz. In the figure, the numbers 1 to 16 refer to the 16 bits of a sample successively transmitted during the period Δt.

Figure 4:
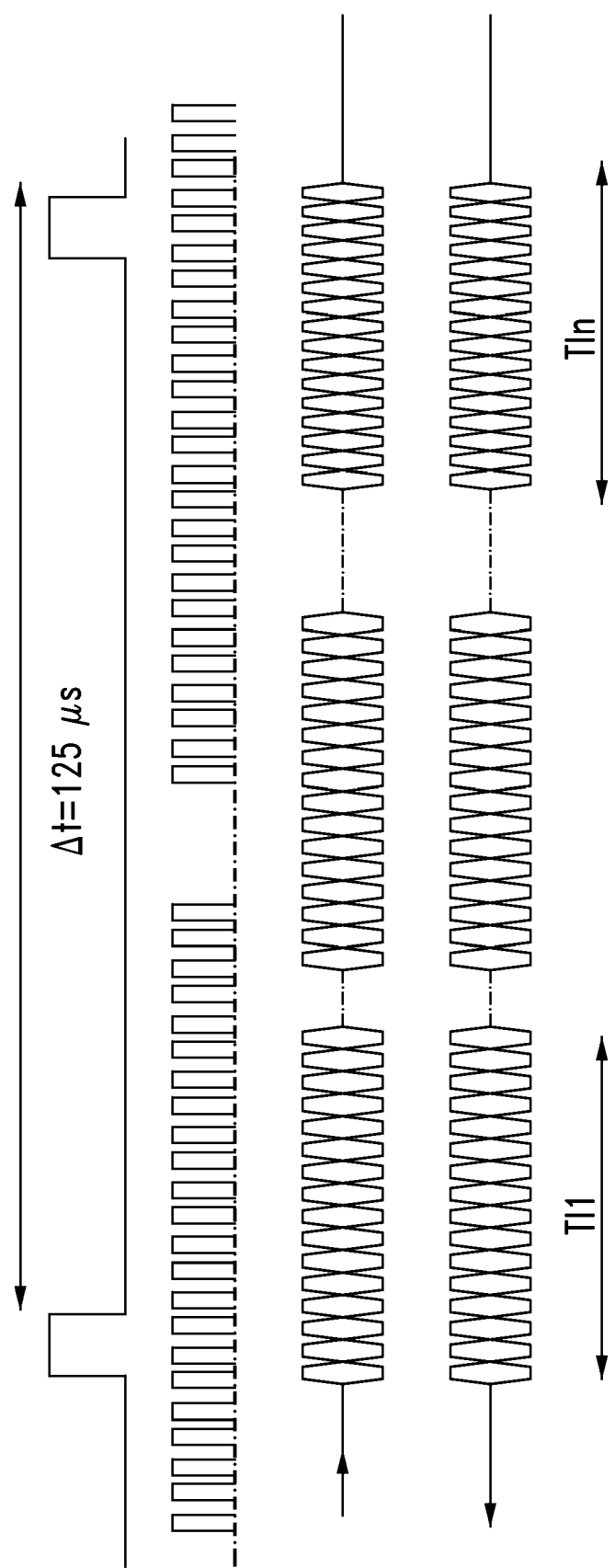

In FIG. 4, the same time diagrams as in FIG. 3 are represented, still showing a frequency of the CLK_Frame signal equal to 8 kHz and 16 bits per sample, but for the case of a PCM signal with N channels.

In this case, the period Δt between two pulses of the CLK_Frame signal is divided into N time intervals, here labeled TI1 to TIn, during each of which the 16 bits encoding a sample of a given audio path are transmitted. In other words, the period of time Δt corresponds to a frame comprising N time intervals TI1 to TIn respectively associated with N audio paths multiplexed by TDMA. The frequency of the CLK_Bit clock signal is then equal to N×8 kHz.

Figure 1:
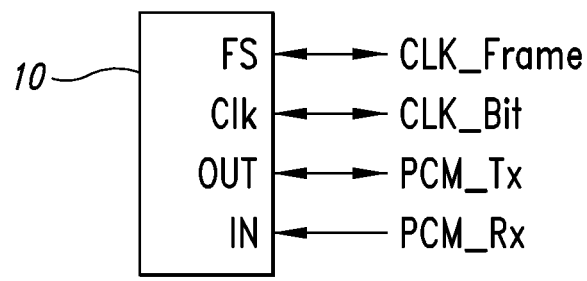
FIG. 1 is a simplified diagram of a functional unit having a known PCM interface.
Figure 5:
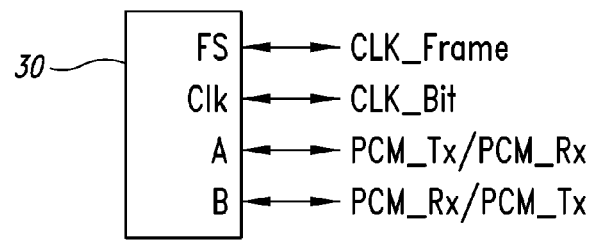
FIG. 5 is a simplified diagram of a functional unit having a PCM interface in accordance with the present invention.

As is shown in FIG. 5, a schematic representative of a PCM interface in an example implementation of the present invention comprises, in addition to clock terminals FS and Clk identical to those of the interface 10 of FIG. 1, data input/output terminals A and B replacing the input terminal IN and the output terminal OUT of interface 10 of FIG. 1. The terminals A and B are reversible, and configurable during operation such that in a first mode of operation, the first data terminal is configured to send but not to receive PCM data and the second data terminal is configured to receive but not to send PCM data, while, in a second mode of operation, the first data terminal is configured to receive but not to send PCM data and the second data terminal is configured to send but not to receive PCM data. Stated otherwise, either the A terminal receives the PCM_Rx signal while the B terminal sends the PCM_Tx signal, or the A terminal sends the PCM_Tx signal while the B terminal receives the PCM_Rx signal.

By convention, the input/output terminals of the interface 30 are labeled A(IN) and B(OUT) when they are configured in the first mode of operation, and are labeled A(OUT) and B(IN) when they are configured in the second mode of operation. It can also be said that the A(IN) and B(IN) terminals are configured for receiving and the A(OUT) and B(OUT) terminals are configured for sending.

Figure 2:
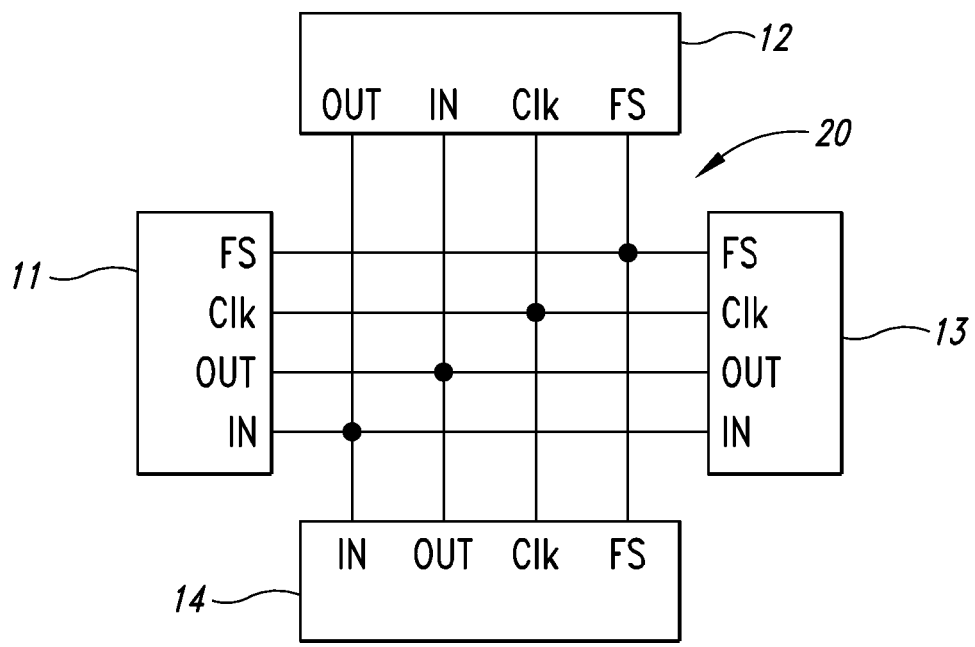
FIG. 2 is a diagram of a known sample system comprising functional units which each have a PCM interface, and are interconnected by a fixed connecting network.
Figure 6:
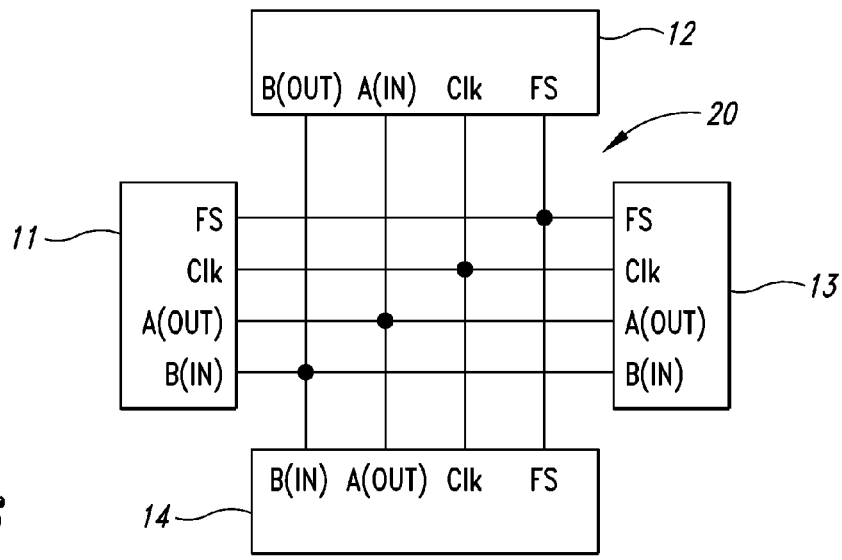
FIG. 6 is a diagram of the system of FIG. 2, created with functional units having PCM interfaces in accordance with the present invention.

FIG. 6, using the above labeling scheme, shows a schematic representation of the system in FIG. 2 in which the functional units 11-14 are equipped with PCM interfaces configured to function like the system in FIG. 2.

Figure 7:
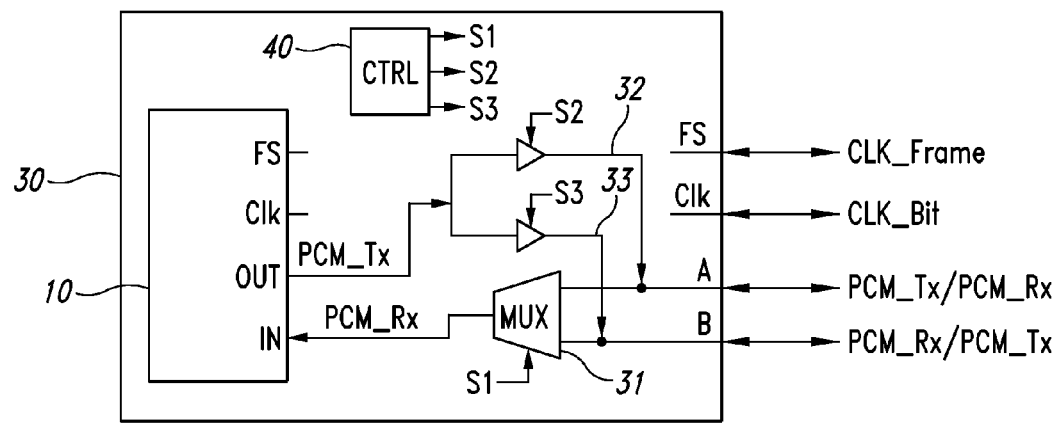
FIG. 7 is a more detailed diagram of an example of creating a PCM interface in accordance with the present invention; and, FIGS. 8 to 11 are diagrams illustrating various other configurations for using the system of FIG. 6.

In FIG. 7, a more detailed diagram of a possible embodiment of the interface 30 according to the invention comprises an interface 10 according to FIG. 1 and additional features that will now be described.

The FS and Clk clock terminals of the interface 30 are connected to the corresponding terminals of the interface 10 by connections which are not represented in order to avoid cluttering the diagram.

The data input/output terminals A and B of the interface 30 are connected to the respective inputs from a two-input multiplexer 31, whose output is connected to the data input IN of the interface 10. The multiplexer 31 is commanded by a control signal S1 such that, in the first mode of operation, the signal received at the A terminal of the interface 30 (meaning the PCM_Rx signal) is sent to the input IN of the interface 10, while in the second mode of operation, it is the signal received at the B terminal of this interface 30 (here again meaning the PCM_Rx signal) which is sent to the input IN of the interface 10.

The output OUT of the interface 10, which delivers the PCM_Tx signal, is connected to the A terminal of the interface 10 through a controlled unidirectional transmission port 32, controlled by a signal S2. This same output OUT from the interface 10 is also connected to the B terminal of the interface 30 through another controlled unidirectional transmission port, controlled by a control signal S3. The ports 32 and 33 are configured to avoid sending any signals present at terminals A and B of the interface 30 to the output OUT of the interface 10. The signals S2 and S3 are positioned such that, in the first mode of operation, the PCM_Tx signal is sent to the B terminal of the interface 30 via the port 33 while, in the second mode of operation, it is sent to the A terminal of the interface 30 via the port 32.

Implementation of the multiplexer 31 and the ports 32 and 33, for example in CMOS technology, does not pose any special problems for and can be implemented by a person skilled in the art.

In one embodiment, the interface 30 additionally comprises a control unit 40 for generating the control signals S1, S2 and S3 as a function of the current mode of operation. In one variation, the control unit 40 may be implemented outside the interface 30, for example in the functional unit which integrates this interface, or in the system which integrates this functional unit. In this case, there may be centralized means of control for generating the control signals S1, S2 and S3 for the respective PCM interfaces of each of the functional units comprised in the system.

We will now describe various ways for using the system according to FIG. 2, in which the PCM interfaces for each of the functional units 11-14 are implemented in accordance with the present invention. In all these cases the connection, via the connecting network, of the terminals of the PCM interfaces of the functional units of the system, is fixed. Nevertheless, because of the configurable character of the input/output terminals A and B of these interfaces, the cases for their use are not thereby limited.

These examples consider the case of a system corresponding to a portable communication device (for example a telephone, a computer, a PDA, etc.) equipped with multimedia functions, in which:

the functional unit 11 is an audio coder/decoder (codec), combined with at least one microphone 111 and at least one speaker 112;

the functional unit 12 is a modulator/demodulator (modem) ensuring the sending and receiving of voice signals, via a radio transmission channel for example;

the functional unit 13 is a "Bluetooth" controller (BTH) ensuring the short-range wireless interface with a peripheral device, such as a telephone headset 131 (comprising speakers and at least one microphone) or an equivalent device; and, the functional unit 14 is a multimedia microprocessor (μP), through which audio data may be read from or written to external memory (MEM) 140, such as a "MicroDrive" or a mini hard drive, or storage or a memory card such as Flash, CompactFlash, SD, MultiMedia (MMC), SmartMedia, TransFlash, etc.

The A terminals of the PCM interfaces of all these units are interconnected via the connecting network 20. In the same manner, their B terminals are interconnected via the connecting network 20. These connections are fixed. They cannot be modified during operation.

Figure 8:
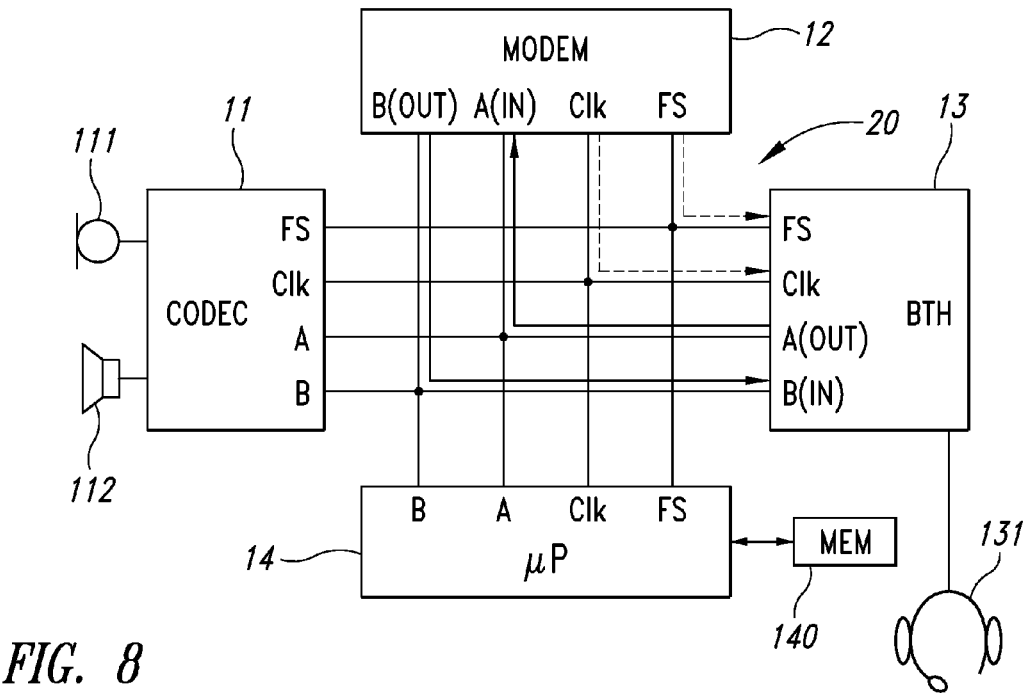

As is shown in FIG. 8, one use corresponds to the processing of a telephone call (a "Voice Call") between the modem 12 and the "Bluetooth" controller 13 during the use, for example, of a telephone headset. The microcontroller 14 and the codec 11 are not used and may be shut off (sleeping, standby mode, power saving mode, or similar).

In this case, the terminals A and B of the modem 12 are respectively configured to receive and send, and they are respectively labeled A(IN) and B(OUT). Conversely, the terminals A and B of the "Bluetooth" controller 13 are respectively configured to send and receive, and they are respectively labeled A(OUT) and B(IN). The audio data are exchanged simultaneously in the two directions (solid arrows), meaning that the data communication occurs in duplex. One will note that symmetric configuration of the A and B inputs for each of the units 12 and 13 is also possible.

One will also note that the configuration of terminals A and B of the other units, here the codec 11 and the microprocessor 14, is immaterial. Any risk of a transmission conflict or of data interference is still avoided, given that the other units do not send data.

Given that there are only two functional units that communicate via the connecting network 20, a single channel PCM format may be used, meaning with one time interval per PCM frame (i.e., N=1).

In the example, it is modem 12 which is the master, meaning it transmits the clock signals CLK_Frame and CLK_Bit to the slave "Bluetooth" controller 13 (dotted arrows). However, the reverse is also possible, independently of the configuration of the A and B inputs for each of the units 12 and 13. The master unit could also be unit 11 or unit 14, but this would require keeping this unit active solely for this function, which is not ideal, as it could otherwise be turned off.

Figure 9:
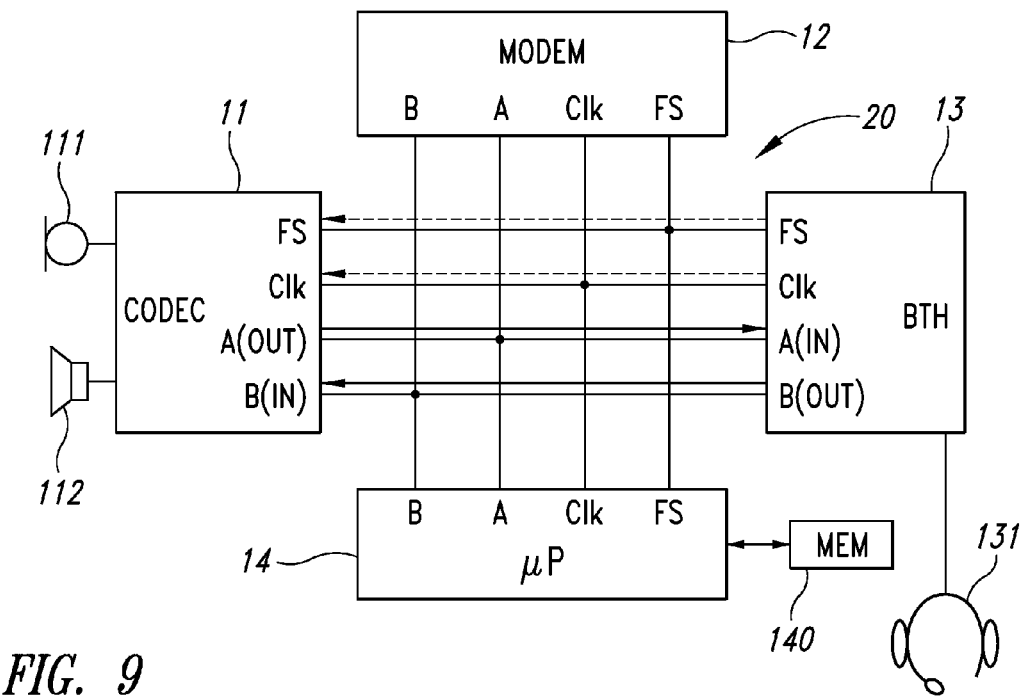

As is shown in FIG. 9, a second use corresponds, for example, to the connection of the "BlueTooth" controller 13 to the codec 11, for example when the user uses his or her telephone as an audio peripheral for a gaming console. The microcontroller 14 and the modem 12 are not used.

In this case, the terminals A and B of the "BlueTooth" controller 13 are respectively configured for example to receive and to send, and are respectively labeled A(IN) and B(OUT). Conversely, the terminals A and B of the codec 11 are correspondingly configured respectively to send and to receive, and they are therefore respectively labeled A(OUT) and B(IN). The audio data are simultaneously exchanged in both directions (solid arrows). For example, it is the "BlueTooth" controller 13 which is the master, meaning it transmits the clock signals CLK_Frame and CLK_Bit to the slave codec 11 (dotted arrows).

Figure 10:
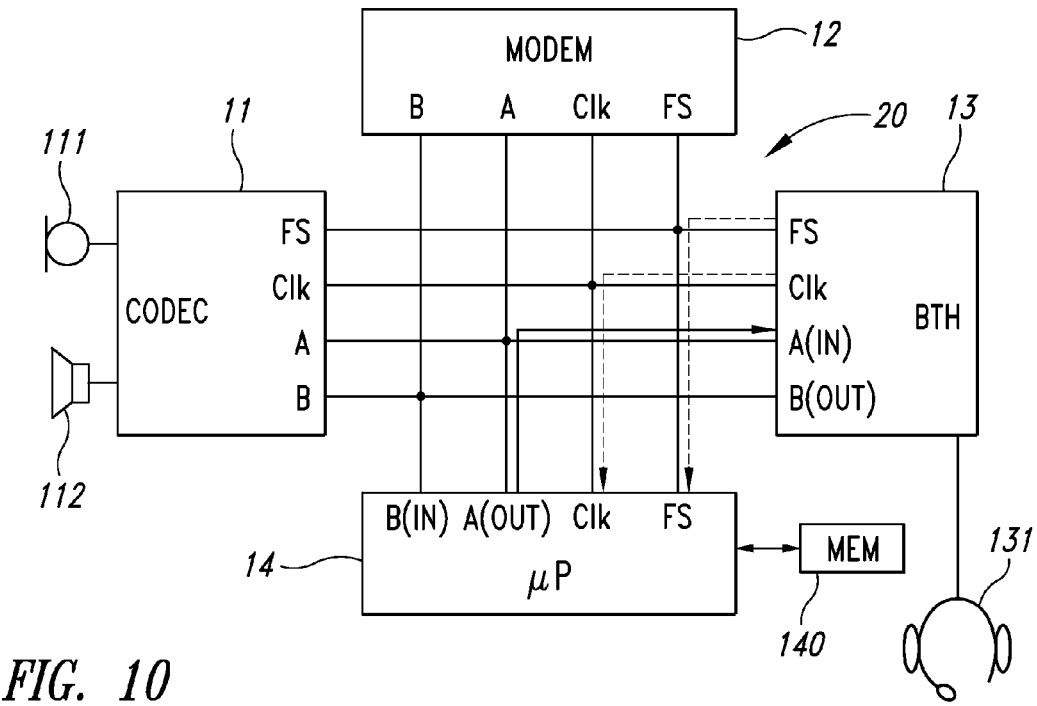

As is shown in FIG. 10, a third use corresponds, for example, to replaying ("Play Back"), via an external telephone headset, a communication previously saved in the telephone's memory (not represented). In this case, the microprocessor 14 sends audio data to the "BlueTooth" controller 13, but the latter does not return the data. The codec 11 and the modem 12 are not used.

In this case, the terminal A and B of the "BlueTooth" controller 13 are, for example, respectively configured to receive and to send, and they are respectively labeled A(IN) and B(OUT). Conversely, the terminals A and B of the microprocessor 14 are correspondingly configured respectively to send and to receive, and they are therefore respectively labeled A(OUT) and B(IN). The audio data are transmitted only between the A terminals of the units 14 and 13, from the microprocessor 14 to the "BlueTooth" controller 13 (solid arrow). The connection between the B terminals of the units 13 and 14 is, for example, in the high impedance state (HZ). For example, here the "BlueTooth" controller 13 is the master, meaning it transmits the clock signals CLK_Frame and CLK_Bit to the slave microprocessor 14 (dotted arrows).

Figure 11:
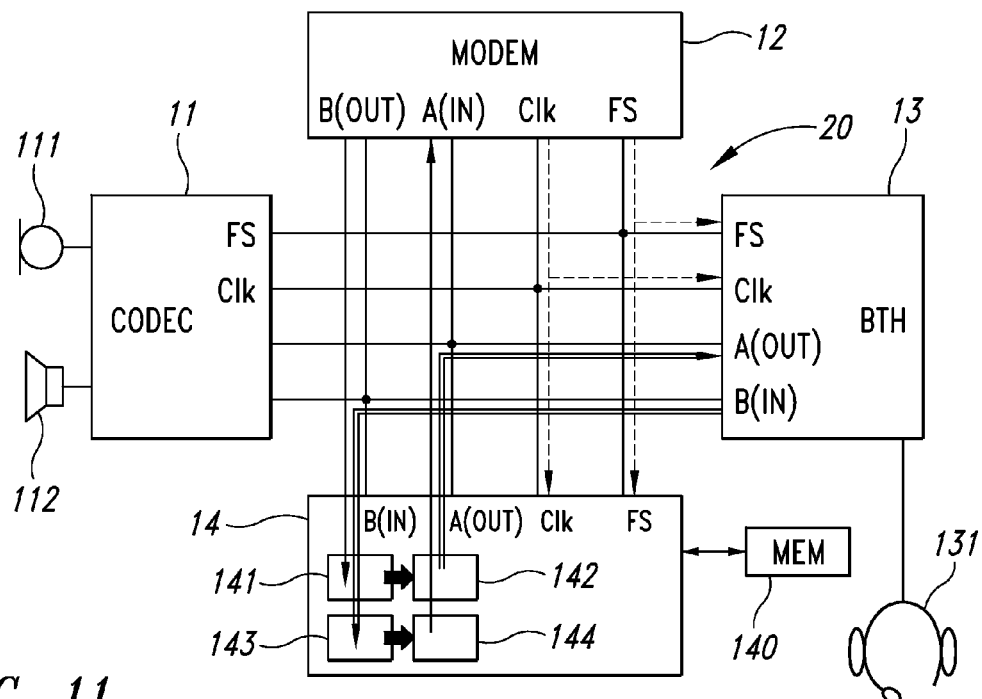

As is shown in FIG. 11, a fourth use corresponds, for example, to simultaneously saving a communication in progress. The communication passes through the modem 12, which is therefore active. It is carried out by the user with, for example, the external telephone headset 131 with the "BlueTooth" controller 13 active. The communication is saved to memory by the microprocessor 14, which is therefore also active. Only the codec 11 is not used and may be shut off.

In this case, the terminals A and B of the modem 12 are respectively configured to receive and to send, and they are respectively labeled A(IN) and B(OUT). Conversely, the terminals A and B of the microprocessor 14 are respectively configured to send and to receive, and they are respectively labeled A(OUT) and B(IN). In addition, the terminals A and B of the "BlueTooth" controller 13 are respectively configured to receive and to send, and they are respectively labeled A(IN) and B(OUT).

In the example, it is the modem 12 which is the master, meaning it transmits the clock signals CLK_Frame and CLK_Bit to the "BlueTooth" controller 13 (dotted arrows) and to the microprocessor 14 which are slaves.

Each PCM frame here must comprise at least two TI, hereinafter labeled TI1 and TI2. In other words, this is a case where N=2. The operation is as follows:

During the time interval TI1, audio data are transmitted between the B terminals of units 12 and 14, from the modem 12 to the microprocessor 14, and audio data are transmitted between their A terminals (duplex mode), from the microprocessor 14 to the modem 12 (single solid arrows). In the microprocessor, the data received from the modem 12 are stored in a register 141, and those sent to the modem 12 are read from another register 144.

At the end of the time interval TI1 (meaning during the last cycle of the bit-level synchronizing clock signal included in the time interval TI1) the contents of the register 141 are copied to another register 142, and the contents of yet another register 143 are copied to register 144. The role of these other registers 142 and 143 will now be shown. It is also at this time, for example, that the data respectively sent and received by the microprocessor 14 are saved to the external memory 140 for later use.

During the time interval TI2, the audio data are transmitted between the A terminals of the units 14 and 13, from the microprocessor 14 to the "BlueTooth" controller 13, and audio data are transmitted between their B terminals (duplex mode), from the "BlueTooth" controller 13 to the microprocessor 14 (double solid arrows). In the microprocessor, the data sent to the "BlueTooth" controller 13 are read from the register 142, and those received from the "BlueTooth" controller 13 are stored in the register 143.

Stated otherwise, the data exchanged between the modem 12 and the "BlueTooth" controller 13, in one direction or the other, travel through a pair of registers 141,142 or 143,144 respectively. The contents of one of the two registers in each pair are loaded during one of the two time intervals TI1 and TI2, are copied to the other register of the pair seemingly between the time intervals TI1 and TI2 (actually during the last cycle of the CLK_Bit signal in the first time interval TI1), and are read from this other register during the time interval TI2.

The fact that two time intervals are used per PCM frame means that no latency is perceptible to the user in comparison to the case in FIG. 8. One must simply use a bit-level synchronizing clock signal CLK_Bit which is twice as fast, because here N=2.

One will note that, for the more complex cases (particularly those involving the four functional units, and all the more so if the system comprises more than four functional units), it may be necessary to increase the number of registers in the processor 14. The number N of time intervals per PCM frame will then need to be increased. More particularly, there will need to be a first group of N registers (here corresponding to registers 141 and 143) and a second group of N registers (corresponding here to registers 142 and 144), respectively for each direction of the data communication (i.e., from or to the functional unit concerned). A PCM format with N time intervals per PCM frame will then be used.

It may also be advantageous to modify the configuration of the A and B terminals of a given functional unit, from one time interval to the next, meaning between two consecutive time intervals of the same PCM frame or two consecutive PCM frames.

Lastly one will note that, as was stated earlier, the implementation of the invention is independent of the configuration of the functional units and of their PCM interface as master or slave. The PCM interface for all or part of the functional units of the system may therefore comprise a master/slave type control switch for the functional unit, which is controlled independently of the configuration of the PCM interfaces.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An interface circuit configured for communication of data in a bi-directional mode, comprising:
    a first bi-directional data terminal and a second bi-directional data terminal, the first and second data terminals each structured to be reversible and configurable during operation to send and receive data over time frames composed of intervals of time; and a control circuit coupled to the first and second data terminals to control the first and second data terminals during operation, such that, in a first mode of operation, the first data terminal is configured to send only and not to receive data and the second data terminal is configured to receive only and not to send data, while in a second mode of operation, the first data terminal is configured to receive only and not to send data, and the second data terminal is configured to send only and not to receive data, and in which the first and second data terminals are structured to switch from the first mode of operation to the second mode of operation or the reverse, from one time interval to another within the time frame.

2. The interface circuit of claim 1 wherein the data are received or sent in the form of frames, each frame comprising multiple logical channels multiplexed by TDMA and respectively associated with time the intervals.

3. The interface circuit of claim 2, further comprising:
    a frame-level synchronizing clock terminal for receiving and sending a frame-level synchronizing clock signal; and,
    a bit-level synchronizing clock terminal for receiving and sending a bit-level synchronizing clock signal.

4. The interface circuit of claim 1, configured for the communication of data in PCM format.

5. An electronic device, comprising: an interface device configured for the communication of data in a duplex mode, and comprising:
    a first data terminal and a second data terminal, with one of said first and second data terminals assigned to a direction of communication that is a reverse of a direction of communication of the other of the first and second data terminals, wherein the first and second data terminals are configurable during operation, such that, in a first mode of operation, the first data terminal is configured to send only and not to receive data and the second data terminal is configured to receive only and not to send data, while in a second mode of operation, the first data terminal is configured to receive only and not to send data, and the second data terminal is configured to send only and not to receive data; and
    a first group of N data registers and a second group of N data registers for storing data received from one of the first and second data terminals and for storing data to be transmitted on the other of the first and second data terminals over time frames composed of intervals of time, and in which the first and second data terminals are structured to switch from the first mode of operation to the second mode of operation or the reverse, from one time interval to another within a time frame, and wherein the data stored in the N data registers of the first group or of the second group, are received or sent, respectively, in N respective time intervals of a frame of time.

6. The electronic device of claim 5 wherein the data are received or sent in the form of frames, each frame comprising multiple logical channels multiplexed by TDMA and respectively associated with time intervals.

7. An electronic system, comprising:
    multiple electronic devices connected to each other by a connecting network, each electronic device comprising:
    an interface circuit structured to communicate data in a bi-directional mode over time frames composed of intervals of time, the interface circuit including a first bi-directional data terminal and a second bi-directional data terminal, and a control circuit coupled to the first and second data terminals to control the first and second data terminals during operation, such that, in a first mode of operation, the first data terminal is structured to send only and not to receive data and the second data terminal is structured to receive only and not to send data, while in a second mode of operation, the first data terminal is structured to receive only and not to send data, and the second data terminal is structured to send only and not to receive data; and a first group of N data registers and a second group of N data registers, respectively, for storing data received on one of the first and second data terminals during the second and first mode of operations, respectively, and for storing data to be sent on the other one of the first and second data terminals during the first and second mode of operations, respectively, and in which the first and second data terminals are structured to switch from the first mode of operation to the second mode of operation or the reverse, from one time interval to another within a time frame.

8. The system of claim 7 wherein the data are received or sent in the form of frames, each frame including multiple logical channels multiplexed by TDMA and respectively associated with time intervals.

9. The interface circuit of claim 8, further comprising:
a frame-level synchronizing clock terminal structured to receive and send a frame-level synchronizing clock signal; and,
a bit-level synchronizing clock terminal structured to receive and send a bit-level synchronizing clock signal.

10. A portable telephone, comprising:
an electronic system that includes multiple electronic devices connected to each other by a fixed connecting network, each electronic device having:
an interface circuit structured to communicate data in a bi-directional mode over time frames composed of intervals of time, the interface circuit including a first bi-directional data terminal and a second bi-directional data terminal, and a control circuit coupled to the first and second data terminals structured to control the direction of communication of data on the first and second data terminals during operation, such that, in a first mode of operation, the first data terminal is structured to send only and not to receive data and the second data terminal is structured to receive only and not to send data, while in a second mode of operation, the first data terminal is structured to receive only and not to send data, and the second data terminal is structured to send only and not to receive data; and a first group of N data registers and a second group of N data registers, respectively, for storing data received from N other respective electronic devices on one of the first and second data terminals during the second and first mode of operations, respectively, and for storing data to be sent to the N other respective electronic devices on the other one of the first and second data terminals during the first and second mode of operations, respectively, and in which the first and second data terminals are structured to switch from the first mode of operation to the second mode of operation or the reverse, from one time interval to another within a time frame.

11. The system of claim 10 wherein the data are received or sent in the form of frames, each frame comprising multiple logical channels multiplexed by TDMA and respectively associated with time intervals.

12. The interface circuit of claim 11, further comprising:
a frame-level synchronizing clock terminal for receiving and sending a frame-level synchronizing clock signal; and,
a bit-level synchronizing clock terminal for receiving and sending a bit-level synchronizing clock signal.

13. A circuit adapted for use with an input and an output, the circuit comprising: a configurable interface that is structured to communicate data over time frames composed of intervals of time, the interface including a first port, a second port, and a control circuit to configure the directional flow of date across the interface on the first and second ports of the circuit in a first mode of operation, in which the first port is configured to send only and not to receive data and the second port configured to receive only and not to send data, and in a second mode of operation, in which the first port is configured to receive only and not to send data and the second port is configured to send only and not to receive data, and in which the first and second ports are structured to switch from the first mode of operation to the second mode of operation or the reverse, from one time interval to another within a time frame.

14. The circuit of claim 13 wherein the data are received or sent in the form of frames, each frame including multiple logical channels multiplexed by TDMA and respectively associated with time intervals.

15. The circuit of claim 14, further comprising:
a frame-level synchronizing clock terminal structured to receive and send a frame-level synchronizing clock signal; and,
a bit-level synchronizing clock terminal structured to receive and send a bit-level synchronizing clock signal.

* * * * *